US009098315B1

(12) United States Patent
Kapoor et al.

(10) Patent No.: US 9,098,315 B1
(45) Date of Patent: Aug. 4, 2015

(54) GENERIC WEB SERVICE ADAPTOR FOR PERFORMING WEB SERVICE OPERATIONS FOR MULTIPLE WEB SERVICE PROVIDERS

(71) Applicant: Numerify, Inc., Cupertino, CA (US)

(72) Inventors: Rahul Kapoor, Cupertino, CA (US); A Seby, Bangalore (IN); Heena Hussain, Indore (IN)

(73) Assignee: Numerify, Inc., Cupertino, CA (US)

( * ) Notice: Subject to any disclaimer, the term of this patent is extended or adjusted under 35 U.S.C. 154(b) by 0 days.

(21) Appl. No.: 14/310,859

(22) Filed: Jun. 20, 2014

(51) Int. Cl.
| | | |
|---|---|---|
| G06F 3/00 | (2006.01) |
| G06F 9/44 | (2006.01) |
| G06F 9/46 | (2006.01) |
| G06F 13/00 | (2006.01) |
| G06F 9/445 | (2006.01) |
| G06F 17/30 | (2006.01) |

(52) U.S. Cl.
CPC ...... *G06F 9/44505* (2013.01); *G06F 17/30386* (2013.01)

(58) Field of Classification Search
None
See application file for complete search history.

(56) References Cited

U.S. PATENT DOCUMENTS 7,996,830 B2 * 8/2011 Apte et al. ............ 717/174
8,346,929 B1 * 1/2013 Lai ....................... 709/226

* cited by examiner

Primary Examiner — Craig Dorais
(74) Attorney, Agent, or Firm — Brokaw Patent Law P.C.; Christopher J. Brokaw

(57) ABSTRACT

Approaches for extracting data from data sources using a generic web service adaptor that implements a web services processing framework. Metadata stored in the database is read to identify specified named entities from a plurality of web service providers. Application protocol interface (API) semantics and configurations are retrieved from the metadata. Metadata objects for the specified named entities are fetched. Web services operation API signatures of the metadata objects are validated by comparing with predefined web services operation API signatures stored in the metadata. Web services operations for the specified named entities of the web service providers comprising the data sources are performed to obtain returned result objects. The returned result objects are serialized to XML using the same framework as used by the source web service. An adaptor may be configured to support the plurality of web service providers based on configurations.

22 Claims, 7 Drawing Sheets

| CONFIGURATIONS 302 | VALUE 304 |
|---|---|
| CREDENTIALS | TENANT1SF USERNAME/ PASSWORD |
| ALLOWED TIMES TO CONNECT | 24 HOURS |
| ALLOWED SESSION DURATIONS | 60 MINUTES |
| ALLOWED DEGREE OF PARALLELISM | 8 |

DATABASE 202

FIG. 3A

| CONFIGURATIONS 302 | VALUE 304 |
|---|---|
| CREDENTIALS | TENANT2SF USERNAME/ PASSWORD |
| ALLOWED TIMES TO CONNECT | 9:00 PM – 9:00 AM |
| ALLOWED SESSION DURATIONS | 30 MINUTES |
| ALLOWED DEGREE OF PARALLELISM | 4 |

DATABASE 202

FIG. 3B

| CONFIGURATIONS 302 | VALUE 304 |
|---|---|
| CREDENTIALS | TENANT1SN USERNAME/PASSWORD |
| ALLOWED TIMES TO CONNECT | 24 HOURS |
| ALLOWED SESSION DURATIONS | 45 MINUTES |
| ALLOWED DEGREE OF PARALLELISM | 2 |

DATABASE 202

FIG. 3C

| CONFIGURATIONS 302 | VALUE 304 |
|---|---|
| CREDENTIALS | TENANT2SN USERNAME/PASSWORD |
| ALLOWED TIMES TO CONNECT | 24 HOURS |
| ALLOWED SESSION DURATIONS | 45 MINUTES |
| ALLOWED DEGREE OF PARALLELISM | 2 |

DATABASE 202

FIG. 3D

GENERIC WEB SERVICE ADAPTOR FOR PERFORMING WEB SERVICE OPERATIONS FOR MULTIPLE WEB SERVICE PROVIDERS

BACKGROUND

1. Technical Field

The embodiments herein generally relate to web service adaptors, and, more particularly, to a generic web service adaptor for performing web service operations for multiple web service providers.

2. Description of the Related Art

Data is the representation of information typically in a manner suitable for communication interpretation and processing. Metadata describes and gives information about other data. The data is typically organized to model relevant aspects of reality in a way that supports processes requiring this information. In computing, ODBC (Open database connectivity) is a standard programming language middleware application programming interface (API) for accessing a database management system. JDBC is a similar Java-Based data access technology. This technology that is an application programming interface for the Java Programming language that defines how a client may access the database. Likewise, OLE DB (Object linking and Embedding Database), is an application programming interface that allows accessing data from a variety of sources in a uniform manner.

Conventional methods for data developers have used protocols like ODBC, JDBC, OLE DB or just exported data into simple flat files with comma separated values (CSV format) and loaded data from those files. The protocols like ODBC, JDBC or OLEDB specify precise APIs for different operations that data source providers complying with these protocols look ahead to implement, so consuming metadata and data from providers that comply with such protocols becomes an easy use of the published APIs.

However, not all modern cloud based data sources like Salesforce, ServiceNow, NetSuite, Eloqua, and Marketo support protocols like ODBC, JDBC and OLE DB APIs. ServiceNow is a software-as-a-service (SaaS) provider of IT service management (ITSM) software. Salesforce is a global computing platform. It is known best for its customer relationship management (CRM) software. NetSuite markets cloud-based integrated business management software. This includes software for ERP, accounting, order management, inventory, CRM, professional services automation (PSA), and E-commerce applications. Eloqua is a marketing automation SaaS platform which develops automated marketing and demand generation software and services for business-to-business marketers.

These cloud based data sources support REST or SOAP style web services. To access data sources supporting web services, custom web service adapters may be written in-house or purchased from third-party software vendors. With SOAP web services, the available APIs are specified in a WSDL file, however the description of web services through WSDL is not complete, because not all the semantics around how to invoke the APIs is fully captured in the WSDL descriptions. Further, there are source specific nuances (e.g., configurations) that one needs to be concerned of such as credentials to connect, allowed times to connect, allowed session durations, idle timeouts, allowed degree of parallelism during fetching, data volumes fetch able at one go, time window for which to fetch data updates, etc. With REST web services, the interfaces for different operations like GET, POST, PUT, DELETE, HEAD are standardized with support for passing different parameters to these interfaces. There are efforts to describe REST web services through WADL (along the lines of WSDL for SOAP) but they are still in infancy.

The web services model provides the flexibility of describing APIs with attached metadata makes it easily usable in any domain without the need for standardization work (e.g., as in the traditional protocols). This has contributed to the widespread use of web services, but that same flexibility also has made it harder to consume web services in a generic fashion. Since service providers may end up supporting a large number of data sources with web service APIs, it is important for scalability reasons to be able to source data using a single web services adaptor instead of writing one per source that requires to be supported. Accordingly there remains a need for a generic web service adaptor that is capable of handling various data sources for performing web service operations without writing one per source that requires to be supported.

SUMMARY

In view of the foregoing, an embodiment herein provides a processor implemented method of extracting data from one or more data sources using a generic web service adaptor that implements a web services processing framework, the method comprising reading a metadata stored in a database, to identify a first named entity for which modified data is to be received from a data source; retrieving from the metadata stored in the database, at least one configuration and at least one application protocol interface (API) semantic specific to the data source based on the first named entity, wherein the metadata comprises predefined configurations and predefined source application protocol interface (API) semantics corresponding to the plurality of data sources, wherein the predefined source application protocol interface (API) semantics comprise a plurality of predefined API signatures; fetching a metadata object for the first named entity of the data source, wherein the metadata object comprises data API signatures; validating the data API signatures of the metadata object based on a comparison of the data API signatures of the metadata object and the plurality of predefined API signatures stored in the metadata to obtain validated data API signatures; and extracting data for the first named entity from the modified data received from the data source to obtain returned result objects based on the validated data API signatures, wherein the data is extracted when the data API signatures match the plurality of predefined API signatures stored in the metadata.

The processor implemented method may further comprise serializing the returned result objects using the same framework as used by the web services over the data source to obtain serialized returned result objects. Validating the data API signatures comprises determining changes in the data API signatures based on the comparison. The processor implemented method may further comprise updating at least one application protocol interface (API) semantic in the database based on the changes; and analyzing the changes by performing a comparison of parameter sets of data API signatures with corresponding application protocol interface (API) semantic to obtain blocking changes and non-blocking changes, wherein the blocking changes comprises a change to the API name, an addition of a required parameter to an API that require a manual input, and wherein the non-blocking changes comprises an order in which the parameter sets are passed to an API, a removal of a parameter of the parameter sets from the API, an addition of an optional parameter to the API that are automatically incorporated.

The processor implemented method may further comprise identifying a second named entity; invoking metadata API to fetch metadata for the second named entity; fetching a second metadata object for the second named entity, wherein the second metadata object for second named entity comprising data API signatures; and extracting data for the second named entity using the validated data API signatures of the second metadata object.

The processor implemented method may further comprise determining a change in at least one of the predefined configurations stored in the metadata in the database; and flagging at least one of predefined configurations to trigger a manual updating of the at least one of the predefined configurations based on the change. The generic web service adaptor is configured to support the plurality of data sources based on a plurality of configurations comprising: (i) allowed times to connect, (ii) allowed session durations and time windows, (iii) supported authentication protocols and credentials, (iv) allowed degree of parallelism for web service operations, (v) allowed data volumes fetchable in one call, and (vi) entities to process and time window of required data modifications. The plurality of configurations comprises the predefined configurations stored in the metadata in the database. The processor implemented method that further comprises retrieving configurations specific to the plurality of data sources from the metadata stored in the database; establishing a session for the plurality of data sources and tenants based on the retrieved configuration comprising (i) the allowed time to connect, (ii) the maximum allowed session duration, and (iii) the supported authentication protocols and credentials; setting data extraction for a plurality specified entities for the time window specified in the retrieved configurations; and determining a number of threads to be created for simultaneous data extraction based on the retrieved configurations for the allowed degree of parallelism; and iterating invoking a plurality of data extraction APIs to limit data fetched in one call based on the retrieved configurations for the allowed data volumes fetchable in one call.

Another embodiment provides a processor implementing method of extracting data from a plurality of data sources using a generic web service adaptor that implements a web services processing framework, the method comprising reading metadata stored in a database to identify (i) a first named entity for which a first modified data is to be received from a first data source, and (ii) a second named entity for which a second modified data is to be received from a second data source; retrieving from the metadata stored in a database, (i) a first application protocol interface (API) semantic and a first configuration specific to the first data source based on the first named entity, and (ii) a second application protocol interface (API) semantic and a second configuration specific to the second data source based on the second named entity, wherein the metadata comprises predefined configurations and predefined source application protocol interface (API) semantics corresponding to the plurality of data sources, wherein the predefined source application protocol interface (API) semantics comprise a plurality of predefined API signatures; fetching (i) a first metadata object for the first named entity of the first data source, and (ii) a second metadata object for the second named entity of the second data source, wherein the first metadata object comprises a first set of data API signatures, wherein a first API is invoked when the first metadata object is fetched, wherein a second API is invoked when the second metadata object is fetched, and wherein the second metadata object comprises a second set of data API signatures; validating the first set of data API signatures of the first metadata object and the second set of data API signatures of the second metadata object based on a comparison of (i) the first data API signatures of the first metadata object and the plurality of predefined API signatures stored in the metadata, and (ii) the second data API signatures of the second metadata object and the plurality of predefined API signatures stored in the metadata to obtain a second set of validated data API signatures; extracting (i) a first data for the first named entity from the first modified data received from the first data source to obtain a first set of returned result objects based on the first set of validated data API signatures, and (ii) a second data for the second named entity from the second modified data received from the second data source to obtain a second set of returned result objects based on the second set of validated data API signatures; and serializing, using the same framework as used by the web services over the first data source and the second data source, (i) the first set of returned result objects to obtain a first set of serialized returned result objects, and (ii) the second set of returned result objects to obtain a second set of serialized returned result objects.

The generic web service adaptor is configured to support the plurality of data sources based on the predefined configurations comprising: (i) allowed times to connect, (ii) allowed session durations and time windows, (iii) supported authentication protocols and credentials, (iv) allowed degree of parallelism for web service operations, (v) allowed data volumes fetchable in one call, and (vi) entities to process and time window of required data modifications stored in the metadata. The processor implemented method may further comprise retrieving configurations specific to the first data source and the second data source from the metadata stored in the database; establishing (i) a first session for the first data source and (ii) a second session for the second data source based on the retrieved configurations comprising (i) the allowed time to connect, (ii) the maximum allowed session duration, and (iii) the supported authentication protocols and credentials; setting data extraction for a plurality of specified entities for the first data source and the second data source for the time window specified in the retrieved configurations; determining a number of threads to be created for simultaneous data extraction based on the retrieved configurations for the allowed degree of parallelism; and iterating invoking a plurality of data extraction APIs to limit data fetched in one call based on the retrieved configurations for the allowed data volumes fetchable in one call.

Validating the first set of data API signatures and the second set of data API signatures comprises determining changes in the first set of data API signatures and the second set of data API signatures. The processor implemented method may further comprise updating the at least one application protocol interface (API) semantic based on the changes in the first set of data API signatures and the second set of data API signatures; and analyzing the changes by performing a comparison of parameter sets of data API signatures for at least one application protocol interface (API) semantic to obtain blocking changes and non-blocking changes, wherein blocking changes comprise a change to the API name, an addition of a required parameter to an API that require a manual input, and wherein the non-blocking changes comprises an order in which the parameter sets are passed to an API, a removal of a parameter of the parameter sets from the API, an addition of an optional parameter to the API that are automatically incorporated, and wherein the first data and the second data are extracted when the first set of data API signatures and the second set of data API signatures match the plurality of predefined API signatures stored in the metadata.

Another embodiment provides a processor implementing a generic web service adaptor that performs web services operations from a plurality of web service providers, wherein the generic web service adaptor implements a web services processing framework, the generic web service adaptor comprising: a database that stores metadata comprising predefined source specific configurations and predefined source application protocol interface (API) semantics corresponding to the plurality of web service providers, wherein the predefined source application protocol interface (API) semantics comprise a plurality of predefined web services operation API signatures; a metadata reading module implemented by the processor that reads the metadata to identify a first named entity for which modified data is to be received from a web services provider; an information retrieving module implemented by the processor that retrieves from metadata stored in the database, at least one configuration and at least one application protocol interface (API) semantic that is specific to the web service provider; a validating module implemented by the processor that validates web services operation API signatures of a metadata object fetched using at least one API semantic based on a comparison of the web services operation API signatures of the metadata object and the plurality of predefined web services operation API signatures stored in the metadata to obtain validated web services operation API signatures; a web services operation performing module implemented by the processor that performs a web services operation for the first named entity on the web services provider to obtain a set of returned result objects based on the validated data API signatures; and a serializing/de-serializing module implemented by the processor serializes the returned result objects using same framework as used by the web services over the web services provider, to obtain serialized returned result objects.

The processor implemented generic web service adaptor may further comprise an API invocation module implemented by the processor that invokes a metadata API to perform a web services operation for the first named entity on the web services provider when the metadata object is fetched, wherein the processor implemented generic web service adaptor is configured to support the plurality of web service providers based on a plurality of configurations comprising: (i) allowed times to connect, (ii) allowed session durations and time windows, (iii) supported authentication protocols and credentials, (iv) allowed degree of parallelism for web service operations, (v) entities to process and if applicable time window to scope specified operations, and wherein the plurality of configurations comprises said predefined configurations stored in the metadata in the database. The processor implemented generic web service adaptor supports the plurality of web service providers by retrieving configurations specific to the plurality of web service providers from the metadata stored in the database; establishing a session for the plurality of web service providers and tenants based on the retrieved configuration comprising (i) the allowed time to connect, (ii) the maximum allowed session duration, and (iii) the supported authentication protocols and credentials; setting processing for a plurality of specified entities for the time window specified in the retrieved configurations; and determining a number of threads to be created for simultaneous processing based on the retrieved configurations for the allowed degree of parallelism.

The validating module further (i) determines changes in the web services operation API signatures, and (ii) analyzes the changes by performing a comparison of parameter sets of web services operation API signatures for the at least one application protocol interface (API) semantic to obtain blocking changes and non-blocking changes, and wherein the generic web service adaptor further comprises an updating module implemented by the processor updates the at least one application protocol interface (API) semantic based on the changes, wherein the blocking changes comprise a change to the API name, an addition of a required parameter to an API that require a manual input, and wherein the non-blocking changes comprises an order in which the parameter sets are passed to an API, a removal of a parameter of the parameter sets from the API, an addition of an optional parameter to the API that are automatically incorporated.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3A through 3D illustrate a table view of one or more configurations and corresponding configuration values for one or more web service providers such as the one or more data sources stored in the metadata in the database according to an embodiment herein;

DETAILED DESCRIPTION OF PREFERRED EMBODIMENTS

Figure 1:
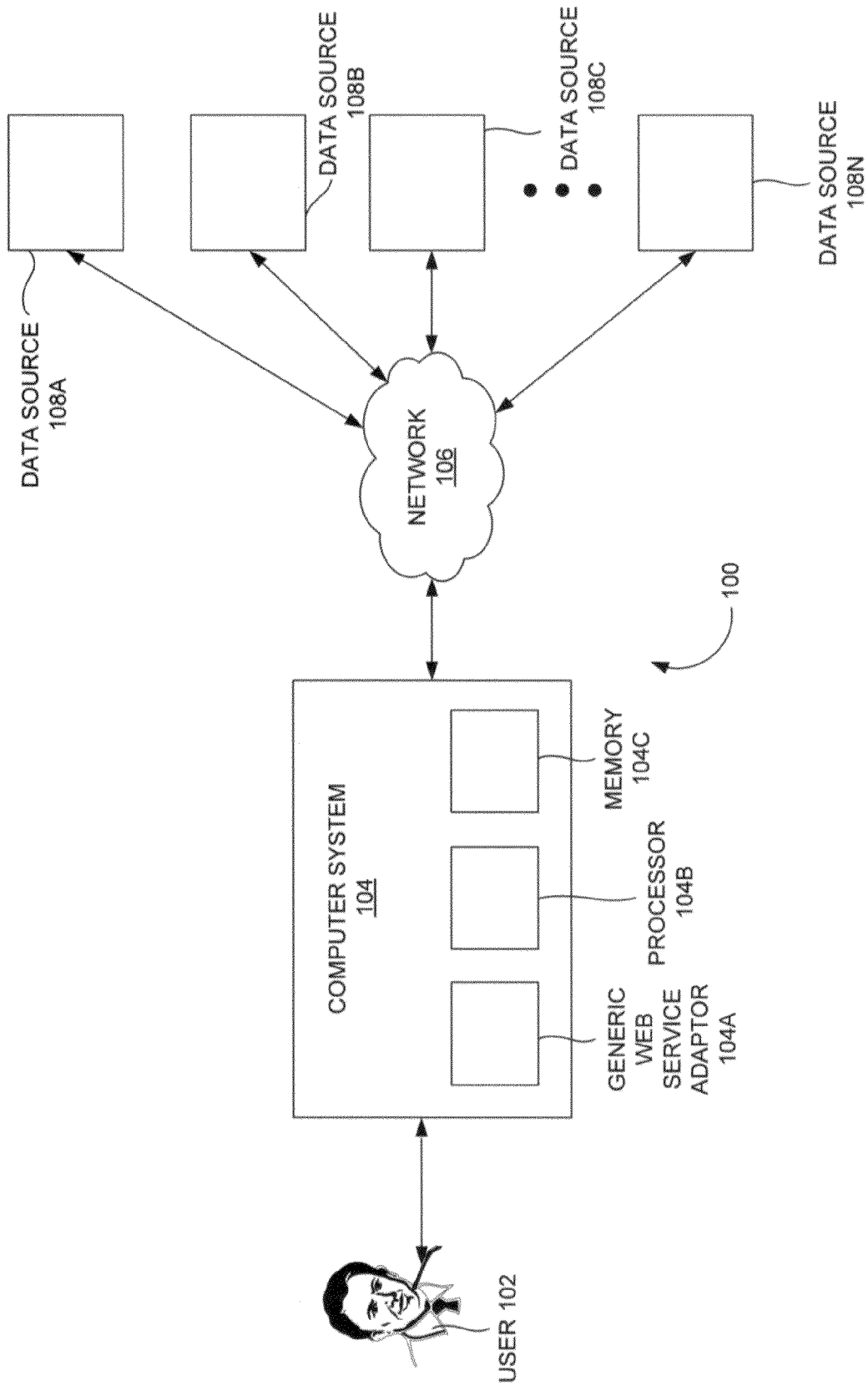
FIG. 1 is a system illustrating a user interacting with a generic web service adaptor using a computer system for performing one or more web services operations for one or more data sources through a network according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a generic web service adaptor that is capable of handling various web service providers comprising data sources for web services operations (e.g., data extraction) without writing one per source that needs to be supported. The embodiments herein achieve this by providing the generic web service adaptor that obtains configurations from a web service provider of a plurality of web service providers, each of the configurations is specific to a tenant associated with the web service provider comprising the data source, obtains application protocol interface (API) semantics specific to the data source, stores the configurations and the application protocol interface (API) semantics in metadata in a database, reads a metadata stored in the database to identify a specified entity (optionally a time interval) from the data source for which modified data is to be received from the data source, retrieves at least one application protocol interface (API) semantic (optionally at least one configuration for scheduling the web services operations) from the metadata stored in the database, fetches web services metadata using an end point and credentials of the data source, fetches a metadata object specific using the at least one application protocol interface (API) semantic, validates web services operation API signatures of the metadata object based on a comparison of the web services operation API signatures of the metadata object and predefined web services operation API signatures stored in the metadata, and performs web services operation(s) for the specified entity of the web service provider comprising the data source to obtain returned result objects. The generic web service adaptor serializes the returned result objects to XML using the same framework as used by the source web service to serialize since the returned result objects (APIs return data) are Java objects, thus providing a full fidelity extraction service without any information loss due to going through the generic extractor. Referring now to the drawings, and more particularly to FIGS. 1 through 6, where similar reference characters denote corresponding features consistently throughout the figures, there are shown preferred embodiments.

FIG. 1 is a system 100 illustrating a user 102 interacting with a generic web service adaptor 104A using a computer system 104 for performing one or more web services operations for one or more data sources 108A-N through a network 106 according to an embodiment herein. The computer system 104 further includes a memory 104C that stores instructions and information associated with the one or more data sources 108A-N. The computer system 104 further includes a processor 104B configured by the instructions to execute the generic web service adaptor 104A. The generic web service adaptor 104A stores configurations specific to the one or more data sources 108A-N in metadata during a development phase. The one or more data sources 108A-N comprises, but not limited to, Salesforce, ServiceNow, NetSuite, Eloqua, Marketo, and any other web service providers, etc. During the run time, the generic web service adaptor 104A retrieves data source specific configurations and data source API semantics from metadata, and schedules web service operations based on inputs and the configurations. During the schedule time, web service metadata is fetched using an end point of the data source 108A, and supplied credentials. One or more web services operations specific to a specified entity of the data source 108A are performed when metadata object for the specified entity is fetched and to validate data API signatures against those gathered at the development time.

Figure 2:
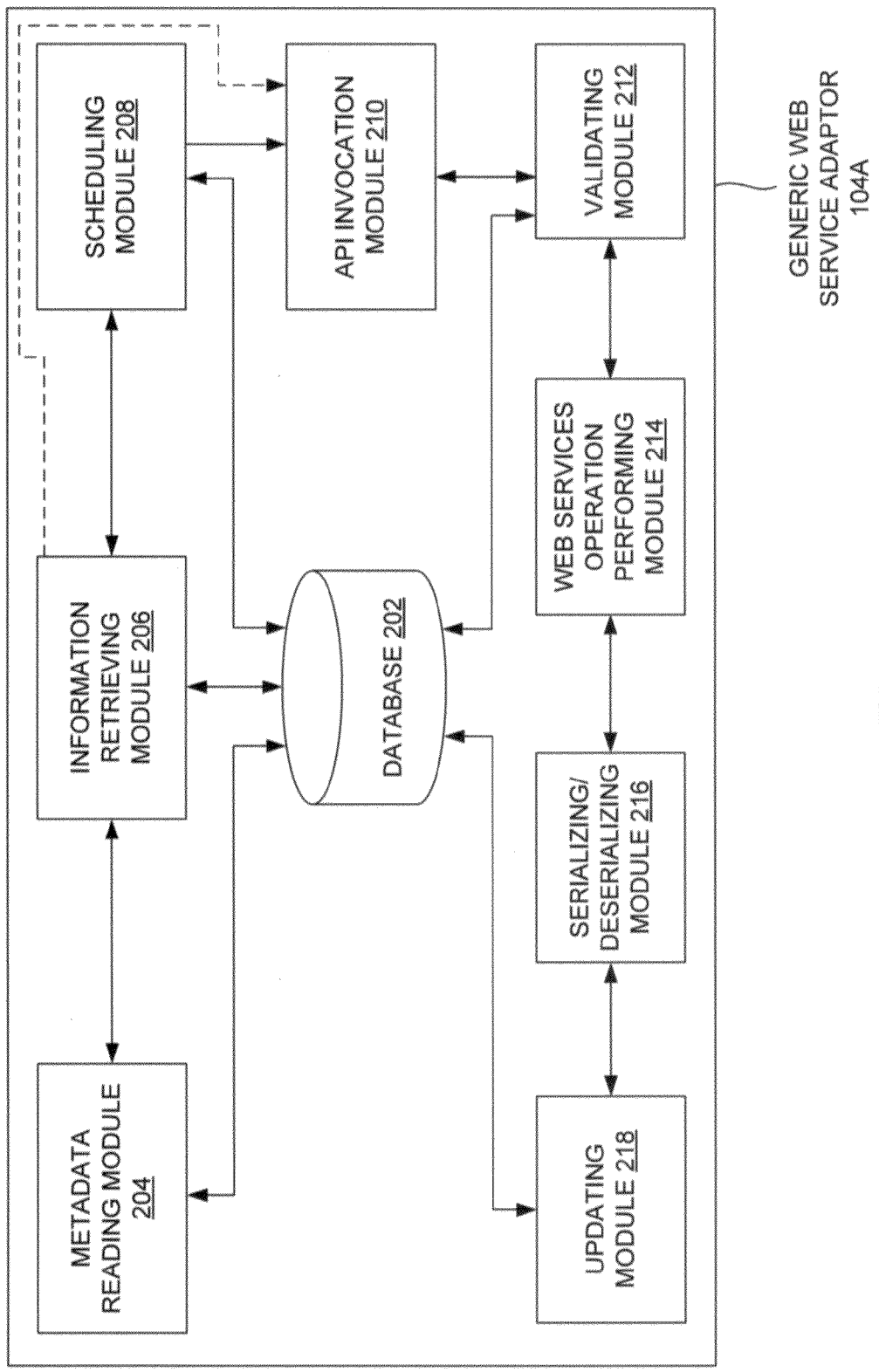
FIG. 2 illustrates an exploded view of the generic web service adaptor of FIG. 1 according to an embodiment herein.

FIG. 2 illustrates an exploded view of the generic web service adaptor 104A of FIG. 1 according to an embodiment herein. The generic web service adaptor 104 includes a database 202, a metadata reading module 204, an information retrieving module 206, a scheduling module 208, an API invocation module 210, a validating module 212, a web services operation performing module 214, a serializing/de-serializing module 216, and an updating module 218. The database 202 stores metadata comprising predefined source specific configurations and predefined source application protocol interface (API) semantics corresponding to the one or more data sources 108A-N. The predefined source application protocol interface (API) semantics comprise one or more predefined web services provider API signatures. The predefined configurations and the predefined source application protocol interface (API) semantics are obtained from one or more web services providers such as the one or more data sources 108A-N at the development time (or development stage). The processor 104B implements the metadata reading module 204, the information retrieving module 206, the scheduling module 208, the API invocation module 210, the validating module 212, the web services operation performing module 214, and the serializing/de-serializing module 216, and the updating module 218. The metadata reading module 204 reads metadata stored in the database 202 and identifies at least one named entity, (optionally a time interval) for which first modified data is to be received from a web services provider such as the first data source 108A. The first modified data comprises a first XML. In other words, the metadata reading module 204 reads metadata to identify the first named entity for which the first modified data is to be received from the first data source 108A, and optionally identifies a time window which are passed as parameters to the generic web services adaptor 104A as part of setting up the job. The named entity is a first named entity, in one example embodiment. The information retrieving module 206 retrieves (i) at least one configuration from the predefined source specific configurations and (ii) at least one application protocol interface (API) semantic from the predefined source specific API semantics from the metadata stored in the database 202 that are specific to the web service provider comprising the first data source 108A based on the first named entity.

The scheduling module 208 schedules web services operation(s) to be performed based on the time interval and the at least one configuration specific to the scheduler such as allowed times to connect and allowed session durations. Web services metadata are fetched using an end point and credentials of the data source 108A. Likewise, appropriate configurations and API semantics may be retrieved from the metadata specific to other web services providers comprising the data sources 108B-N to identify other named entities comprising a second named entity, and web services metadata are fetched using an end point and supplied credentials of the second web service provider (i.e., the second data source 108B). A first metadata object is fetched (using a WSDL fetcher) for the first named entity of the first data source 108A using the first application protocol interface (API) semantic. The API invocation module 210 invokes a first metadata application protocol interface (API) based on a first application protocol interface (API) semantic retrieved from the metadata only when the first metadata object is fetched. The metadata API is invoked to perform a web services operation for the first named entity on the first web services provider when the first metadata object is fetched. The first metadata object comprises one or more web services operation API signatures comprising a first set of data API signatures. The generic web service adaptor 104A includes the WSDL fetcher (not shown in FIG. 2) that fetches the first metadata object for the first named entity of the first data source 108A.

The validating module 212 validates the one or more web services operation API signatures comprising the first set of data API signatures of the first metadata object based on a comparison of the web services operation API signatures comprising the first set of data API signatures of the first metadata object and the predefined web services operation API signatures stored in the metadata in the database 202. The web services operation performing module 214 performs one or more web services operations based on the comparison, for the first named entity on the web services provider comprising the data source 108A to obtain a first set of returned result objects. The web services operation performing module 214 performs the specified operation comprising extracting data for the first named entity to obtain a first set of returned result objects based on the comparison. The one or more web services operations are performed when the first set of web services operation API signatures of the first metadata object match the predefined web services operation API signatures stored in the metadata.

Likewise, a second named entity may be identified (e.g., using the metadata reading module 204) for which a second modified data is to be received from a second data source 108B. The second modified data comprises a second XML. A second metadata object is fetched (using a WSDL fetcher) for the second named entity. The API invocation module 210 invokes a second metadata application protocol interface (API) when the second metadata object is fetched. The second metadata API is invoked to perform a web services operation comprising data extraction for the second named entity on the second web services provider when the second metadata object is fetched. The second metadata object comprises one or more web services operations API signatures comprising a second set of data API signatures. The generic web service adaptor 104A includes the WSDL fetcher (not shown in FIG. 2) that fetches the second metadata object for the second named entity of the data source 108B.

The validating module 212 validates the second set of web services operation API signatures comprising the second set of data API signatures of the second metadata object based on a comparison of the second set of web services operation API signatures of the second metadata object and the predefined web services operation API signatures stored in the metadata in the database 202. The web services operation performing module 214 performs one or more web services operations based on the comparison, for the second named entity of the data source 108B to obtain a second set of returned result objects. The one or more web services operations are performed when the second set of web services operations API signatures comprising the second set of data API signatures of the second metadata object match the predefined web services operation API signatures stored in the metadata. The one or more web service operations comprise but not limited to, (i) data extraction from the one or more data sources 108A-N, (ii) online data cleansing, and standardization services where input is a dirty stream and output is a clean set of records or (iii) compute clusters where input may include job files and output may be Boolean, small datasets or processed data files.

The serializing/de-serializing module 216 uses the same framework as used by the web service providers comprising the data sources 108A-B to serialize the first set of returned result objects and the second set of returned result objects, and communicates a first set of serialized returned result objects and a second set of serialized returned results objects to an invoker such as the API invocation module 210 of the generic web service adaptor 104A). Since the returned results objects are Java objects, the serializing/de-serializing module 216 serializes the returned result objects to XML, using the same framework as used by the source web service to serialize, providing a full fidelity extraction service without any information loss due to going through the web service adaptor as opposed to a source specific one. Effectively data goes from XML to Java Objects to XML and it is ensured that there is no loss in the process, hence full fidelity by leveraging the same web services processing framework used by the web service providers such as the data sources 108A-N for serialization/deserialization. The first set of de-serialized returned result objects and the second set of de-serialized returned result objects are serialized (e.g., using the serializing/de-serializing module 216) to obtain a first set of serialized data and a second set of serialized data, hence full fidelity.

The validating module 212 further determines changes in the first set of web services operation API signatures and the second set of web services operation API signatures. These changes are determined when there is a mismatch (or no match) between (i) the first set of web services operation API signatures of the first metadata object and the predefined web services operation API signatures stored in the metadata in the database 202, and (ii) the second set of web services operation API signatures of the second metadata object and the predefined web services operation API signatures stored in the metadata in the database 202. The validating module 212 further analyzes the changes by performing a comparison of parameter sets of web services operation API signatures with the corresponding application protocol interface (API) semantic to obtain blocking changes and non-blocking changes. Non-blocking changes, comprise, but not limited to, change to the order in which parameters are passed to an API, removal of a parameter from an API, addition of an optional parameter to an API that can be automatically incorporated. Blocking changes comprise, but not limited to, a change to the API name, an addition of a required parameter to an API that require a manual input. The updating module 218 updates corresponding at least one application protocol interface (API) semantic based on the changes in the first set of web services operation API signatures and the second set of web services operation API signatures. The web services operation performing module 214 performs web services operations when the changes are updated in the metadata in the database 202. In other words, web service operations against the web service providers such as the data sources 108A-N are performed when the changes are updated in the metadata in the database 202 and when there is a mismatch of web services operation API signatures of the metadata objects and the predefined web services operation API signatures stored in the metadata in the database 202 during the development stage.

Likewise, the metadata reading module 204 reads the metadata to identify another named entity (e.g., a custom named entity). Metadata API is invoked to fetch a metadata for the custom named entity, and a metadata object for the custom named entity is fetched. The metadata object comprises data API signatures. Web services operation (e.g., data cleansing) specific to the custom named entity is performed using the data API signatures of the metadata object. The metadata object is always obtained through standard metadata APIs, the dynamic binding mechanism is introduced based on introspection of the metadata objects returned and for certain cases like custom entities for which the APIs cannot be captured to use at development time, therefore dynamic binding is the only mechanism to identify the APIs to use at runtime. It is further determined if there are changes in the predefined configurations stored in the metadata in the database 202, and these changes are flagged to trigger a manual updating of at least one of the predefined configurations. In other words, the source configurations are typically not programmatically discoverable and so there is a manual process to keep them up to-date in the metadata, changes to some (e.g., credentials) that cause run-time errors can be flagged to trigger manual updating.

FIG. 3A through 3D, with reference to FIGS. 1 and 2, illustrate a table view of one or more configurations and corresponding configuration values for one or more web service providers such as the one or more data sources 108A-N stored in the metadata in the database 202 according to an embodiment herein. The database 202 includes a configurations field 302, and a value field 304. In particular, FIGS. 3A-3B illustrates a table view of the one or more configurations and corresponding configuration values for SalesForce (SF) data source, in an example embodiment. In particular, FIGS. 3C-3D illustrates a table view of the one or more configurations and corresponding configuration values for ServiceNow (SN) data source, in another example embodiment. The configurations field 302 includes the one or more configurations that comprise but not limited to, credentials, allowed times to connect, allowed session durations, and allowed degree of parallelism, etc. Likewise, the value field 304 includes one or more values that are specific to the one or more configurations. For example, corresponding value for the configuration allowed times to connect is 24 hours as depicted in FIG. 3A. Similarly, corresponding value for the configuration allowed session durations is 60 minutes as depicted in FIG. 3A. Likewise, corresponding value for the configuration allowed degree of parallelism is 8 as depicted in FIG. 3A. It is to be further understood, that configurations and corresponding values specific to the configurations are stored in the metadata in the database 202 for various web service providers such as the one or more data sources 108B-N as depicted from the FIGS. 3B-3D.

The configurations field 302 includes the one or more configurations that are read (or parsed) and passed to either the scheduling module 208 (e.g., allowed times to connect, allowed session durations) or the core adaptor (not shown in FIG. 3A-3D) e.g., authentication protocol and credentials, allowed degree of parallelism during fetching, data volumes fetch able, etc. Theses configurations may be tenant specific (e.g., ones which vary from one tenant to another tenant for the same source (e.g., credentials) or source specific (e.g., ones which are common across tenants accessing the same source (e.g., authentication protocol) but since web service operation is performed for a tenant, the entire list of configurations are enumerated per tenant.

The scheduling module 208 uses the configuration inputs to schedule appropriately, whereas the core adaptor 104A uses them in its logic to support the plurality of web service providers. The generic web service adaptor 104A is configured to retrieve configurations specific to the plurality of web service providers from the metadata stored in the database 202, establish a session for the plurality of web service providers and tenants based on the retrieved configuration comprising (i) the allowed time to connect, (ii) the maximum allowed session duration, and (iii) the supported authentication protocols and credentials, set processing for the plurality specified entities for a time window specified in the retrieved configurations, determine a number of threads to be created for simultaneous data extraction based on the retrieved configurations for the allowed degree of parallelism, and iterate invoking a plurality of data extraction APIs to limit data fetched in one call (until there is no more data to fetch) based on the retrieved configurations for the allowed data volumes fetchable in one call for supporting the plurality of web service providers. The code for the generic web service adaptor 104A is written to understand configurations and be able to work with any valid configuration value across any web service provider comprising any data source differentiates over conventional web service adaptors that handle configuration in an ad-hoc way.

There may be additional job level inputs (e.g., an entity to extract, a time window of required data modifications, time window/priority of extract job) that are passed to the generic web service adaptor 104A, some of which are used by the scheduling module 208 (e.g., time window/priority of extract job) and others (e.g., entity to read or identify, time window of required data modifications) are passed on to the source APIs. When the source APIs don't support specifying time window of required data modifications, the generic web service adaptor 104A filters fetched data when it comes with create or update timestamps. When the source configurations are not programmatically discoverable, they are updated in metadata based on an input received from a user (e.g., manual updating). Further changes to configurations (e.g., credentials) that result in run-time errors are flagged to trigger manual updating.

Configurations may be mapped to the parameter sets or get used in the logic of the generic web service adaptor 104A. The APIs for which semantics are gathered are typically used for data extraction. For example, NetSuite has different APIs for standard entities vs. customized entities vs. hierarchical entities. Invocation of an appropriate API to be used for an entity and the meaning of the parameters from the parameter sets in the APIs is inferred from the semantics. The source API semantics, that are not available through WSDL, enables the determination of if there are multiple APIs to fetch data. When there are multiple APIs to fetch data, it is determined what are the different entity types that they fetch data from, what is the difference between those entities and what are the meanings of the expected parameters. This information is gathered through an analysis of the WSDL for the data source 108A in conjunction with a review of the provided documentation and potential experimentation with the APIs. This information is stored in metadata and passed on to the generic web service adaptor 104A, based on which an appropriate API is invoked when requested to fetch data for a particular entity from a specified source. Since there may be a change in an API (or an API mismatch), the metadata objects returned as part of the WSDL are validated to establish the APIs to fetch data for those objects at run-time. This process is referred to as dynamic binding. Performing the dynamic binding at run-time allows any changes in the APIs from the time of manual analysis, instead of getting an error on invocation of such APIs. When there is a mismatch in the API signatures during programmatic validation, corresponding source API semantics are flagged for updating without having to stall the process (or operation) for changes which can be automatically incorporated (e.g., a change to the order in which parameters are passed, removal of a parameter, and/or an addition of an optional parameter, etc.). Additionally, the dynamic binding mechanism enables to fetch customer specific entities which may not be researched and captured as part of the source API semantics at the development time as they are unique to an entity and end user and typically do not require parameters to be passed which would need a prior establishment of their semantics.

Figure 4:
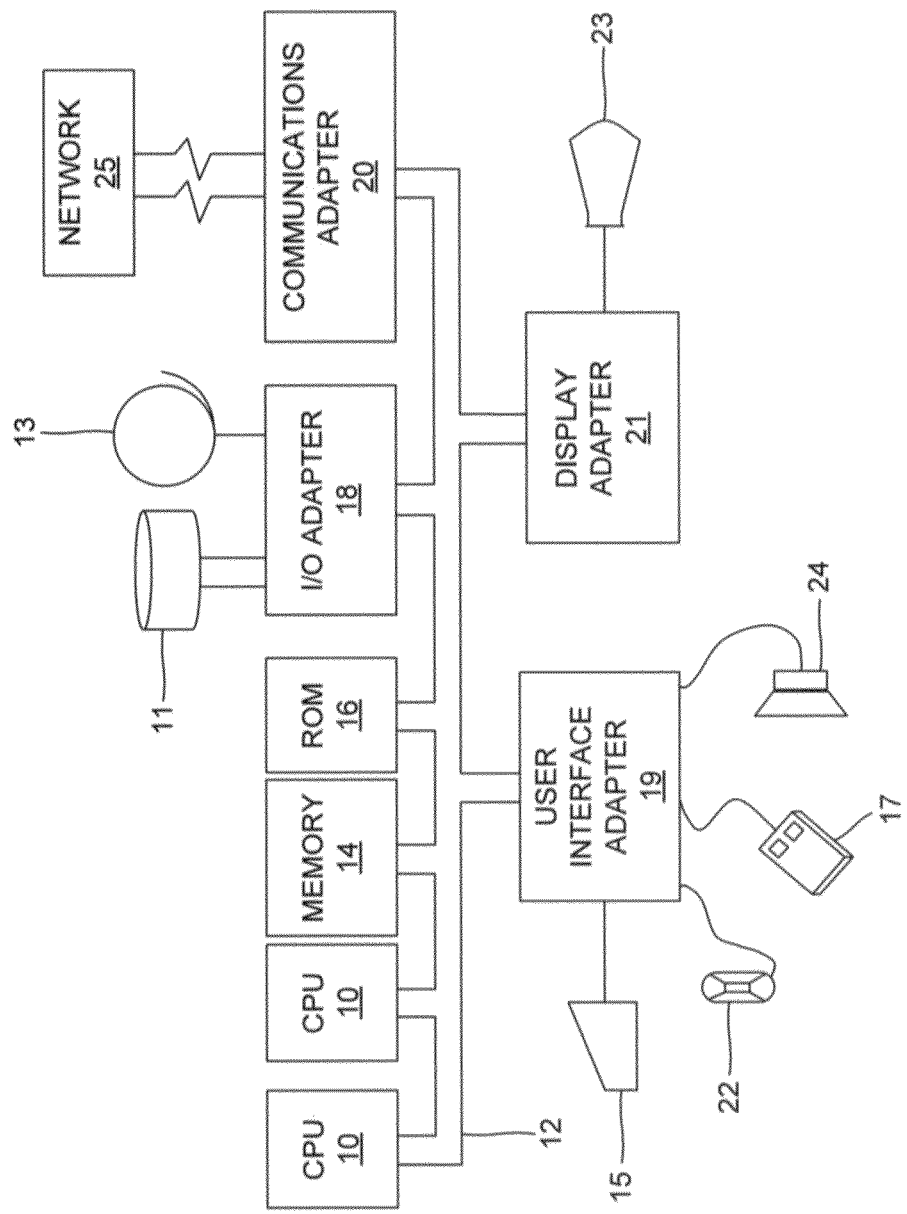
FIG. 4 is a computer system used in accordance with the embodiments herein.

FIG. 4, with reference to FIGS. 1 through 3, is the computer system 104 of FIG. 1 used in accordance with the embodiments herein. The computer system 104 comprises at least one of a personal computer, a laptop, a tablet device, a smartphone, a mobile communication device, a personal digital assistant, or any other such computing device, in one example embodiment, in another example embodiment. This schematic drawing illustrates a hardware configuration of an information handling/computer system in accordance with the embodiments herein. The system comprises at least one processor (e.g., the processor 104B) or central processing unit (CPU) 10. The CPUs 10 are interconnected via system bus 12 to various devices such as a memory 14, read-only memory (ROM) 16, and an input/output (I/O) adapter 18. Although, CPUs 10 are depicted, it is to be understood that the computer system 104 may be implemented with only one CPU. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communications adapter 20 connects the bus 12 to a data processing network 25, and a display adapter 21 connects the bus 12 to a display device 23 which may be embodied as an output device such as a monitor, printer, or transmitter, for example.

Figure 5:
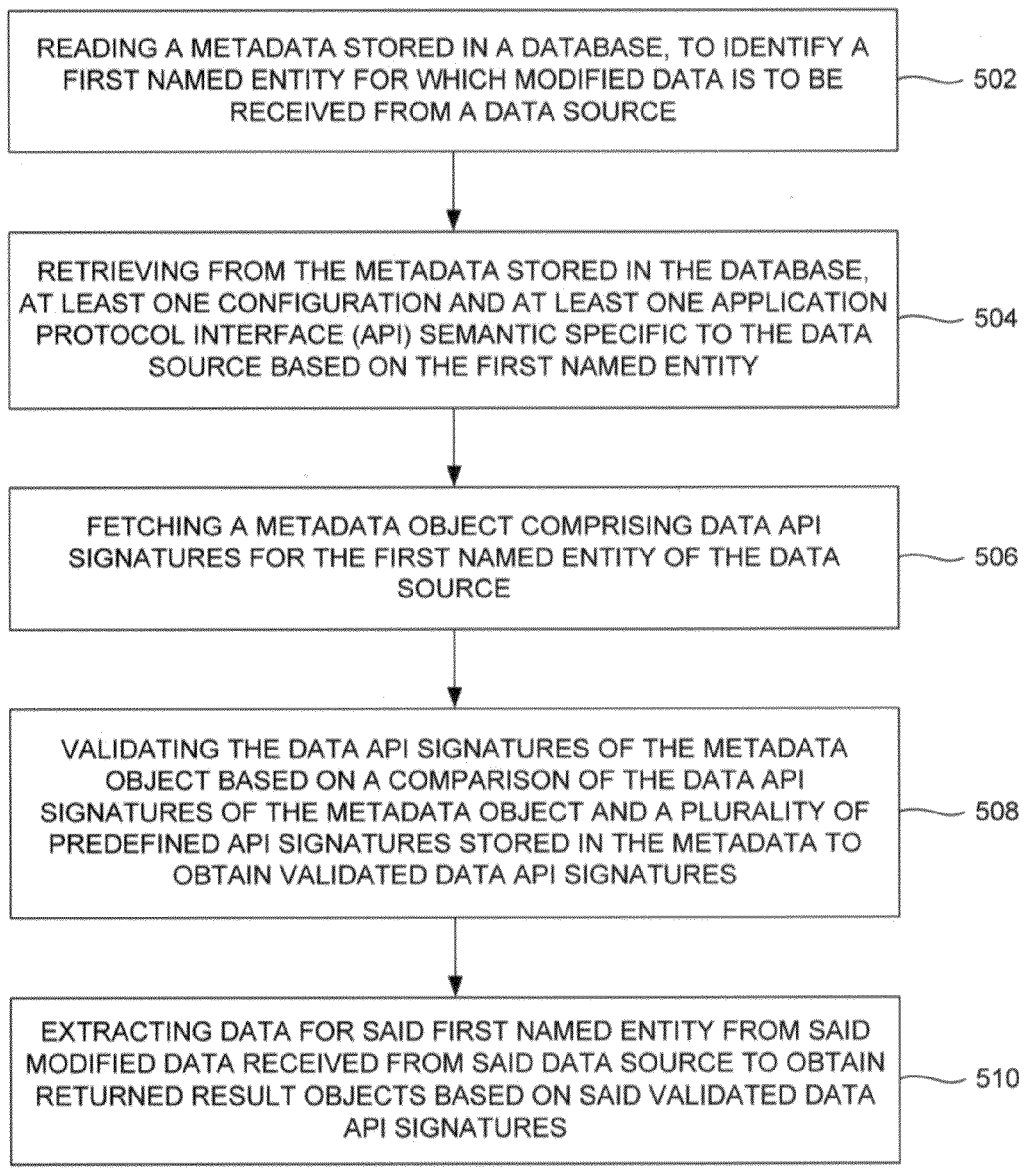
FIG. 5 illustrates a processor implemented method of extracting data from a plurality of data sources using the generic web service adaptor of FIG. 1 according to an embodiment herein.

FIG. 5, with reference to FIGS. 1 through 4, is a flow diagram illustrating a processor implemented method of extracting data from one or more data sources using a generic web service adaptor that implements a web services processing framework, the method comprising reading (502) using the metadata reading module 204, a metadata stored in the database 202, to identify a first named entity for which modified data is to be received from the data source 108A; retrieving (504) using the information retrieving module 206 from the metadata stored in the database 202, at least one configuration and at least one application protocol interface (API) semantic specific to the data source 108A based on the first named entity, wherein the metadata comprises predefined configurations and predefined source application protocol interface (API) semantics corresponding to the plurality of data sources 108A-N, wherein the predefined source application protocol interface (API) semantics comprise a plurality of predefined API signatures; fetching (506) a metadata object for the first named entity of the data source 108A, wherein the metadata object comprises data API signatures; validating (508) using the validating module 212, the data API signatures of the metadata object based on a comparison of the data API signatures of the metadata object and the plurality of predefined API signatures stored in the metadata to obtain validated data API signatures; and extracting (510) using the web services operation performing module 214, data for the first named entity from the modified data received from the data source 108A to obtain returned result objects based on the validated data API signatures.

The processor implemented method may further comprise serializing (e.g., using the serializing/de-serializing module 216) the returned result objects using the same framework as used by the web services over the data source 108A to obtain serialized returned result objects. Validating the data API signatures comprises determining changes in the data API signatures based on the comparison. The processor implemented method may further comprise updating using the updating module 218, at least one application protocol interface (API) semantic in the database 202 based on the changes; and analyzing using the validating module 212, the changes by performing a comparison of parameter sets of data API signatures with corresponding application protocol interface (API) semantic to obtain blocking changes and non-blocking changes, wherein the blocking changes comprises a change to the API name, an addition of a required parameter to an API that require a manual input, and wherein the non-blocking changes comprises an order in which the parameter sets are passed to an API, a removal of a parameter of the parameter sets from the API, an addition of an optional parameter to the API that are automatically incorporated.

The processor implemented method may further comprise identifying a second named entity; invoking metadata API to fetch a metadata for the second named entity; fetching a metadata object for the second named entity, wherein the metadata object for second named entity comprising data API signatures; and extracting data for the second named entity using the validated data API signatures of the another metadata object.

The processor implemented method may further comprise determining a change in at least one of predefined configurations stored in the metadata in the database; and flagging the at least one of predefined configurations to trigger a manual updating of the at least one of the predefined configurations based on the change, wherein the data is extracted when the data API signatures match the plurality of predefined API signatures stored in the metadata. The generic web service adaptor is configured to support the plurality of data sources based on a plurality of configurations comprising: (i) allowed times to connect, (ii) allowed session durations and time windows, (iii) supported authentication protocols and credentials, (iv) allowed degree of parallelism for web service operations, (v) allowed data volumes fetchable in one call, and (vi) entities to process and time window of required data modifications. The processor implemented method may further comprise retrieving configurations specific to the plurality of data sources from the metadata stored in the database 202; establishing a session for the plurality of data sources and tenants based on the retrieved configuration comprising the allowed time to connect, the maximum allowed session duration, and the supported authentication protocols and credentials; setting data extraction for a plurality of specified entities for the time window specified in the retrieved configurations; and determining a number of threads to be created for simultaneous data extraction based on the retrieved configurations for the allowed degree of parallelism; and iterating invoking a plurality of data extraction APIs to limit data fetched in one call based on the retrieved configurations for the allowed data volumes fetchable in one call. The plurality of configurations comprises the predefined configurations stored in the metadata in the database 202.

Figure 6:
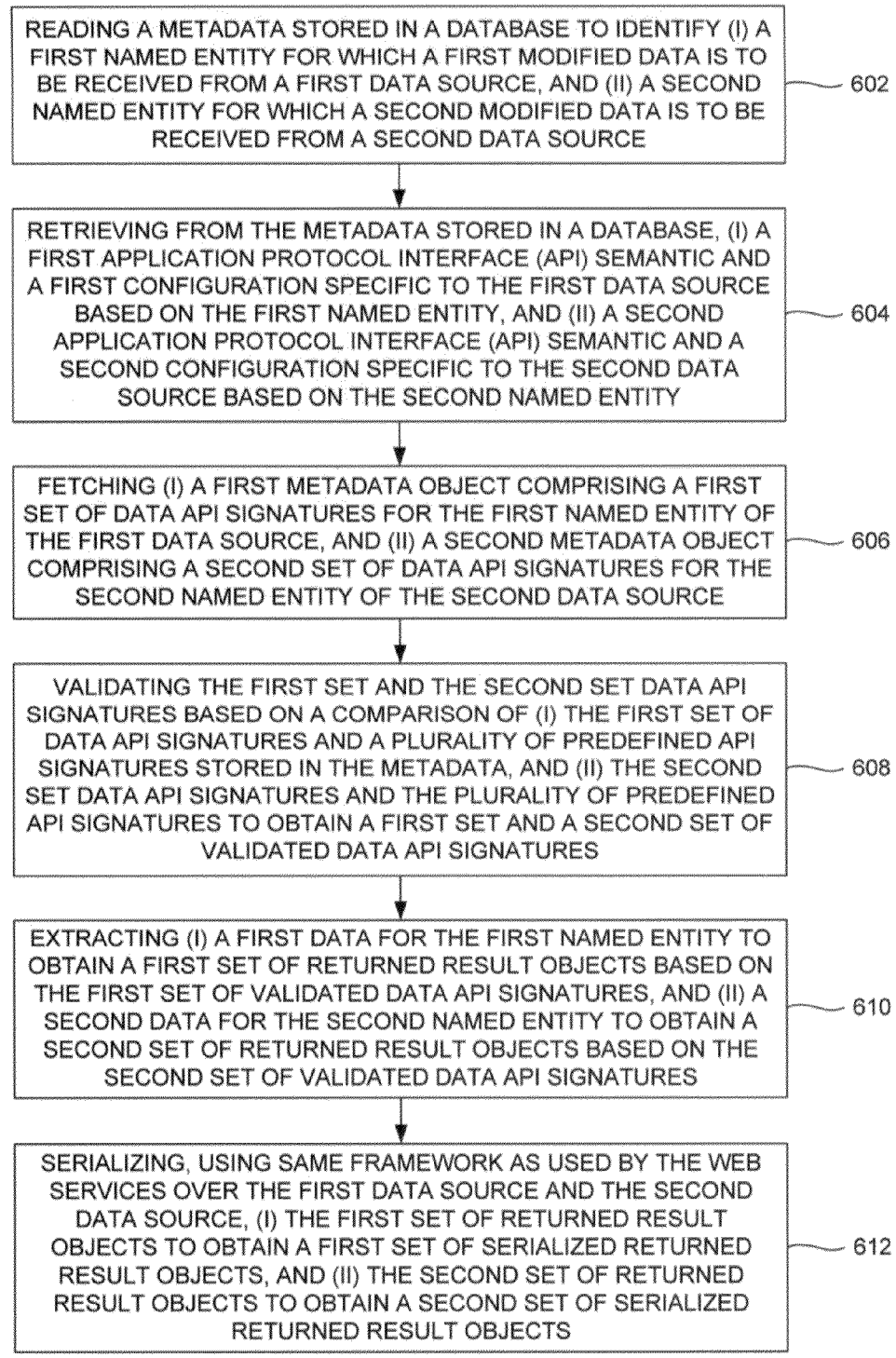
FIG. 6 is a flow diagram illustrating a processor implementing method of extracting data from a plurality of data sources using the generic web service adaptor of FIG. 1 that implements a web services processing framework according to an embodiment herein.

FIG. 6, with reference to FIGS. 1 through 5, is a flow diagram illustrating a processor implementing method of extracting data from a plurality of data sources using the generic web service adaptor 104A of FIG. 1 that implements a web services processing framework, the method comprising reading (602) a metadata (e.g., using the metadata reading module 204) stored in the database 202 to identify (i) a first named entity for which a first modified data is to be received from a first data source (e.g., the data source 108A), and (ii) a second named entity for which a second modified data is to be received from a second data source (e.g., the data source 108B); retrieving (604) from the metadata stored in the database 202 (using the information retrieving module 206), (i) a first application protocol interface (API) semantic and a first configuration specific to the first data source 108A based on the first named entity, and (ii) a second application protocol interface (API) semantic and a second configuration specific to the second data source 108B based on the second named entity, wherein the metadata comprises predefined configurations and predefined source application protocol interface (API) semantics corresponding to the plurality of data sources 108A-N, wherein the predefined source application protocol interface (API) semantics comprise a plurality of predefined API signatures; fetching (606) (i) a first metadata object for the first named entity of the first data source 108A, and (ii) a second metadata object for the second named entity of the second data source 108B, wherein the first metadata object comprises a first set of data API signatures, wherein a first API is invoked when the first metadata object is fetched, wherein a second API is invoked when the second metadata object is fetched, and wherein the second metadata object comprises a second set of data API signatures; validating (608) using the validating module 212, the first set of data API signatures of the first metadata object and the second set of data API signatures of the second metadata object based on a comparison of (i) the first data API signatures of the first metadata object and the plurality of predefined API signatures stored in the metadata, and (ii) the second data API signatures of the second metadata object and the plurality of predefined API signatures stored in the metadata to obtain a second set of validated data API signatures; extracting (610) using the web services operation performing module 214, (i) a first data for the first named entity from the first modified data received from the first data source 108A to obtain a first set of returned result objects based on the first set of validated data API signatures, and (ii) a second data for the second named entity from the second modified data received from the second data 108B source to obtain a second set of returned result objects based on the second set of validated data API signatures; and serializing (e.g., using the serializing/de-serializing module 216), using same framework as used by the web services over the first data source 108A and the second data source 108B, (i) the first set of returned result objects to obtain a first set of serialized returned result objects, and (ii) the second set of returned result objects to obtain a second set of serialized returned result objects.

The generic web service adaptor is configured to support the plurality of data sources 108A-N based on the predefined configurations comprising: (i) allowed times to connect, (ii) allowed session durations and time windows, (iii) supported authentication protocols and credentials, (iv) allowed degree of parallelism for web service operations, (v) allowed data volumes fetchable in one call, and (vi) entities to process and time window of required data modifications stored in the metadata. The processor implemented method may further comprise retrieving configurations specific to the first data source 108A and the second data source 108B from the metadata stored in the database 202; establishing (i) a first session for the first data source 108A and (ii) a second session for the second data source 108B based on the retrieved configurations comprising the allowed time to connect, the maximum allowed session duration, and the supported authentication protocols and credentials; setting data extraction for a plurality of specified entities for the first data source 108A and the second data source 108B for the time window specified in the retrieved configurations; determining a number of threads to be created for simultaneous data extraction based on the retrieved configurations for the allowed degree of parallelism; and iterating invoking a plurality of data extraction APIs to limit data fetched in one call based on the retrieved configurations for the allowed data volumes fetchable in one call.

Validating the first set of data API signatures and the second set of data API signatures comprises determining changes in the first set of data API signatures and the second set of data API signatures. The processor implemented method may further comprise updating (e.g., using the updating module 218) at least one application protocol interface (API) semantic based on the changes in the first set of data API signatures and the second set of data API signatures; and analyzing (e.g., using the validating module 212) the changes by performing a comparison of parameter sets of data API signatures for at least one application protocol interface (API) semantic to obtain blocking changes and non-blocking changes, wherein blocking changes comprise a change to the API name, an addition of a required parameter to an API that require a manual input, and wherein the non-blocking changes comprises an order in which the parameter sets are passed to an API, a removal of a parameter of the parameter sets from the API, an addition of an optional parameter to the API that are automatically incorporated, and wherein the first data and the second data are extracted when the first set of data API signatures and the second set of data API signatures match the plurality of predefined API signatures stored in the metadata.

The generic web service adaptor 104A may be implemented for any business data source by the design of exhaustively enumerating all source specific configurations needed to capture all the different nuances of individual source systems. The source API semantics for the data source are obtained at development time, and used along with source specific configurations (that are stored in the metadata in the database 202) to drive the generic web services adaptor 104A for metadata and data discovery. Unlike the conventional web service adaptors, the generic web service adaptor 104A enables (i) programmatic runtime validation of API signatures based on dynamic binding of APIs and support for custom entities whose API signatures may not be fully established at development time, and (ii) reusing source used serialization/deserialization mechanisms to provide for full fidelity extraction without any information loss due to going through the generic extractor. In other words, when data goes from XML to Java Objects to XML there is no loss in that process resulting in full fidelity by leveraging the same serialization/deserialization framework used by the data source 108A. Tasks to invoke web services exist as part of the offering of several ETL (Extract, transform, load) tools (e.g., SQL Server Integration Services Web Service Task). Thus the generic web service adaptor 104A and the embodiments that describe the above methodology may be implemented as a layer on top of such components (e.g., ETL tools such as SQL Server Integration Services Web Service Task) which makes a web service task usable for any business data source by capturing the source specific configurations and API semantics separately and integrating their use at run time to provide generic connectivity to any business data source.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. One or more non-transitory computer readable storage mediums storing one or more sequences of instructions, which when executed by one or more processors, causes:

extracting data from a plurality of data sources using a generic web service adaptor that implements a web services processing framework by performing the steps of:
  reading metadata stored in a database, to identify a first named entity for which modified data is to be received from a data source;
  retrieving from said metadata stored in said database, at least one configuration and at least one application protocol interface (API) semantic specific to said data source based on said first named entity, wherein said metadata comprises predefined configurations and predefined source application protocol interface (API) semantics corresponding to said plurality of data sources, wherein said predefined source application protocol interface (API) semantics comprise a plurality of predefined API signatures;
  fetching a metadata object for said first named entity of said data source, wherein said metadata object comprises data API signatures;
  validating said data API signatures of said metadata object based on a comparison of said data API signatures of said metadata object and said plurality of predefined API signatures stored in said metadata to obtain validated data API signatures; and
  extracting data for said first named entity from said modified data received from said data source to obtain returned result objects based on said validated data API signatures.

2. The one or more non-transitory computer readable storage mediums of claim 1, wherein executing the one or more sequences of instructions further causes serializing said returned result objects using the same framework as used by the web services over said data source to obtain serialized returned result objects.

3. The one or more non-transitory computer readable storage mediums of claim 1, wherein said validating said data API signatures comprises determining changes in said data API signatures based on said comparison.

4. The one or more non-transitory computer readable storage mediums of claim 3, wherein executing the one or more sequences of instructions further causes updating said at least one application protocol interface (API) semantic in said database based on said changes.

5. The one or more non-transitory computer readable storage mediums of claim 3, wherein executing the one or more sequences of instructions further causes analyzing said changes by performing a comparison of parameter sets of data API signatures with a corresponding application protocol interface (API) semantic to obtain blocking changes and non-blocking changes.

6. The one or more non-transitory computer readable storage mediums of claim 5, wherein said blocking changes comprise a change to an API name, and an addition of a required parameter to an API that requires a manual input.

7. The one or more non-transitory computer readable storage mediums of claim 5, wherein said non-blocking changes comprises an order in which said parameter sets are passed to an API, a removal of a parameter of said parameter sets from said API, and an addition of an optional parameter to said API that is automatically incorporated.

8. The one or more non-transitory computer readable storage mediums of claim 1, wherein executing the one or more sequences of instructions further causes identifying a second named entity;
  invoking metadata API to fetch metadata for said second named entity;
  fetching second metadata object for said second named entity, wherein said second metadata object for second named entity comprises second data API signatures; and
  extracting data for said second named entity using said second data API signatures of said second metadata object.

9. The one or more non-transitory computer readable storage mediums of claim 1, wherein executing the one or more sequences of instructions further causes
  determining a change in at least one of predefined configurations stored in said metadata in said database; and
  flagging said at least one of predefined configurations to trigger a manual updating of said at least one of said predefined configurations based on said change, wherein said data is extracted when said data API signatures match said plurality of predefined API signatures stored in said metadata.

10. The one or more non-transitory computer readable storage mediums of claim 1, wherein said generic web service adaptor is configured to support said plurality of data sources based on a plurality of configurations comprising: (i) allowed times to connect, (ii) maximum allowed session durations and time windows, (iii) supported authentication protocols and credentials, (iv) allowed degree of parallelism for web service operations, (v) allowed data volumes fetchable in one call, and (vi) entities to process and time window of required data modifications, said method further comprising:
  retrieving configurations specific to said plurality of data sources from said metadata stored in said database;
  establishing a session for said plurality of data sources and tenants based on said retrieved configuration comprising (i) said allowed time to connect, (ii) said maximum allowed session duration, and (iii) said supported authentication protocols and credentials;
  setting data extraction for a plurality of specified entities for said time window specified in said retrieved configurations;
  determining a number of threads to be created for simultaneous data extraction based on said retrieved configurations for said allowed degree of parallelism; and
  iterating invoking a plurality of data extraction APIs to limit data fetched in one call based on said retrieved configurations for said allowed data volumes fetchable in one call.

11. One or more non-transitory computer readable storage mediums storing one or more sequences of instructions, which when executed by one or more processors, cause:
  extracting data from a plurality of data sources using a generic web service adaptor that implements a web services processing framework by performing:
    reading a metadata stored in a database to identify (i) a first named entity for which a first modified data is to be received from a first data source, and (ii) a second named entity for which a second modified data is to be received from a second data source;
    retrieving from said metadata stored in a database, (i) a first application protocol interface (API) semantic and a first configuration specific to said first data source based on said first named entity, and (ii) a second application protocol interface (API) semantic and a second configuration specific to said second data source based on said second named entity, wherein said metadata comprises predefined configurations and predefined source application protocol interface (API) semantics corresponding to said plurality of data sources, wherein said predefined source application protocol interface (API) semantics comprise a plurality of predefined API signatures;

fetching (i) a first metadata object for said first named entity of said first data source, and (ii) a second metadata object for said second named entity of said second data source, wherein said first metadata object comprises a first set of data API signatures, wherein a first API is invoked when said first metadata object is fetched, wherein a second API is invoked when said second metadata object is fetched, and wherein said second metadata object comprises a second set of data API signatures;

validating said first set of data API signatures of said first metadata object and said second set of data API signatures of said second metadata object based on a comparison of (i) said first data API signatures of said first metadata object and said plurality of predefined API signatures stored in said metadata, and (ii) said second data API signatures of said second metadata object and said plurality of predefined API signatures stored in said metadata to obtain a first set of validated data API signatures and a second set of validated data API signatures;

extracting (i) a first data for said first named entity from said first modified data received from said first data source to obtain a first set of returned result objects based on said first set of validated data API signatures, and (ii) a second data for said second named entity from said second modified data received from said second data source to obtain a second set of returned result objects based on said second set of validated data API signatures; and serializing, using same framework as used by the web services over said first data source and said second data source, (i) said first set of returned result objects to obtain a first set of serialized returned result objects, and (ii) said second set of returned result objects to obtain a second set of serialized returned result objects.

12. The one or more non-transitory computer readable storage mediums of claim 11, wherein said generic web service adaptor is configured to support said plurality of data sources based on said predefined configurations comprising: (i) allowed times to connect, (ii) allowed session durations and time windows, (iii) supported authentication protocols and credentials, (iv) allowed degree of parallelism for web service operations, (v) allowed data volumes fetchable in one call, and (vi) entities to process and time window of required data modifications stored in said metadata, said method further comprising:

retrieving configurations specific to said first data source and said second data source from said metadata stored in said database;

establishing (i) a first session for said first data source and (ii) a second session for said second data source based on said retrieved configurations comprising (i) said allowed time to connect, (ii) said maximum allowed session duration, and (iii) said supported authentication protocols and credentials;

setting data extraction for a plurality of specified entities for the said first data source and said second data source for a time window specified in said retrieved configurations;

determining a number of threads to be created for simultaneous data extraction based on said retrieved configurations for said allowed degree of parallelism; and iterating invoking a plurality of data extraction APIs to limit data fetched in one call based on said retrieved configurations for said allowed data volumes fetchable in one call.

13. The one or more non-transitory computer readable storage mediums of claim 11, wherein said validating said first set of data API signatures and said second set of data API signatures comprises determining changes in said first set of data API signatures and said second set of data API signatures.

14. The one or more non-transitory computer readable storage mediums of claim 13, wherein execution of the one or more sequences of instructions further causes:

updating said at least one application protocol interface (API) semantic based on said changes in said first set of data API signatures and said second set of data API signatures.

15. The one or more non-transitory computer readable storage mediums of claim 13, wherein execution of the one or more sequences of instructions further causes:

analyzing said changes by performing a comparison of parameter sets of data API signatures for said at least one application protocol interface (API) semantic to obtain blocking changes and non-blocking changes.

16. The one or more non-transitory computer readable storage mediums of claim 15, wherein blocking changes comprise a change to an API name, an addition of a required parameter to an API that requires a manual input, and wherein said non-blocking changes comprises an order in which said parameter sets are passed to an API, a removal of a parameter of said parameter sets from said API, and an addition of an optional parameter to said API that is automatically incorporated, and wherein said first data and said second data are extracted when said first set of data API signatures and said second set of data API signatures match said plurality of predefined API signatures stored in said metadata.

17. A processor implementing a generic web service adaptor that performs web services operations from a plurality of web service providers, wherein said generic web service adaptor implements a web services processing framework, said generic web service adaptor comprising:

a database that stores metadata comprising predefined source specific configurations and predefined source application protocol interface (API) semantics corresponding to said plurality of web service providers, wherein said predefined source application protocol interface (API) semantics comprise a plurality of predefined web services operation API signatures;

a metadata reading module implemented by said processor that reads said metadata to identify a first named entity for which modified data is to be received from a web services provider;

an information retrieving module implemented by said processor that retrieves from metadata stored in said database, at least one configuration and at least one application protocol interface (API) semantic that is specific to said web service provider;

a validating module implemented by said processor that validates web services operation API signatures of a metadata object fetched using said at least one API semantic based on a comparison of said web services operation API signatures of said metadata object and said plurality of predefined web services operation API signatures stored in said metadata to obtain validated web services operation API signatures;

a web services operation performing module implemented by said processor that performs a web services operation for said first named entity on said web services provider to obtain a set of returned result objects based on said validated data API signatures; and
a serializing/de-serializing module implemented by said processor serializes said returned result objects using same framework as used by the web services over said web services provider to obtain serialized returned result objects.

18. The processor implemented generic web service adaptor of claim 17, further comprising:
an API invocation module implemented by said processor that invokes a metadata API to perform a web services operation for said first named entity on said web services provider when said metadata object is fetched,
wherein said processor implemented generic web service adaptor is configured to support said plurality of web service providers based on a plurality of configurations comprising: (i) allowed times to connect, (ii) allowed session durations and time windows, (iii) supported authentication protocols and credentials, (iv) allowed degree of parallelism for web service operations, (v) entities to process and time window to scope operations on said entities.

19. The processor implemented generic web service adaptor of claim 18, wherein the processor implemented generic web service adaptor is further configured to:
retrieve configurations specific to said plurality of web service providers from the metadata stored in said database;
establish a session for said plurality of web service providers and tenants based on said retrieved configuration comprising (i) said allowed time to connect, (ii) said maximum allowed session duration, and (iii) said supported authentication protocols and credentials;
set processing for said plurality of specified entities for the time window specified in the retrieved configurations; and
determine a number of threads to be created for simultaneous data extraction based on said retrieved configurations for said allowed degree of parallelism.

20. The processor implemented generic web service adaptor of claim 17, wherein said validating module further (i) determines changes in said web services operation API signatures, and (ii) analyzes said changes by performing a comparison of parameter sets of web services operation API signatures for said at least one application protocol interface (API) semantic to obtain blocking changes and non-blocking changes,
wherein said generic web service adaptor further comprises an updating module implemented by said processor updates said at least one application protocol interface (API) semantic based on said changes,
wherein blocking changes comprise a change to an API name, an addition of a required parameter to an API that require a manual input, and wherein said non-blocking changes comprises an order in which said parameter sets are passed to an API, a removal of a parameter of said parameter sets from said API, an addition of an optional parameter to said API that are automatically incorporated.

21. A method of extracting data from a plurality of data sources using a generic web service adaptor that implements a web services processing framework, comprising:
reading metadata stored in a database, to identify a first named entity for which modified data is to be received from a data source;
retrieving from said metadata stored in said database, at least one configuration and at least one application protocol interface (API) semantic specific to said data source based on said first named entity, wherein said metadata comprises predefined configurations and predefined source application protocol interface (API) semantics corresponding to said plurality of data sources, wherein said predefined source application protocol interface (API) semantics comprise a plurality of predefined API signatures;
fetching a metadata object for said first named entity of said data source, wherein said metadata object comprises data API signatures;
validating said data API signatures of said metadata object based on a comparison of said data API signatures of said metadata object and said plurality of predefined API signatures stored in said metadata to obtain validated data API signatures; and
extracting data for said first named entity from said modified data received from said data source to obtain returned result objects based on said validated data API signatures.

22. A method for extracting data from a plurality of data sources using a generic web service adaptor that implements a web services processing framework, comprising:
reading a metadata stored in a database to identify (i) a first named entity for which a first modified data is to be received from a first data source, and (ii) a second named entity for which a second modified data is to be received from a second data source;
retrieving from said metadata stored in a database, (i) a first application protocol interface (API) semantic and a first configuration specific to said first data source based on said first named entity, and (ii) a second application protocol interface (API) semantic and a second configuration specific to said second data source based on said second named entity, wherein said metadata comprises predefined configurations and predefined source application protocol interface (API) semantics corresponding to said plurality of data sources, wherein said predefined source application protocol interface (API) semantics comprise a plurality of predefined API signatures;
fetching (i) a first metadata object for said first named entity of said first data source, and (ii) a second metadata object for said second named entity of said second data source, wherein said first metadata object comprises a first set of data API signatures, wherein a first API is invoked when said first metadata object is fetched, wherein a second API is invoked when said second metadata object is fetched, and wherein said second metadata object comprises a second set of data API signatures;
validating said first set of data API signatures of said first metadata object and said second set of data API signatures of said second metadata object based on a comparison of (i) said first data API signatures of said first metadata object and said plurality of predefined API signatures stored in said metadata, and (ii) said second data API signatures of said second metadata object and said plurality of predefined API signatures stored in said metadata to obtain a first set of validated data API signatures and a second set of validated data API signatures;
extracting (i) a first data for said first named entity from said first modified data received from said first data source to obtain a first set of returned result objects based on said first set of validated data API signatures, and (ii) a second data for said second named entity from said second modified data received from said second data source to obtain a second set of returned result objects based on said second set of validated data API signatures; and serializing, using same framework as used by the web services over said first data source and said second data source, (i) said first set of returned result objects to obtain a first set of serialized returned result objects, and (ii) said second set of returned result objects to obtain a second set of serialized returned result objects.

* * * * *